US012603770B2

(12) United States Patent
Buttolph

(10) Patent No.: US 12,603,770 B2
(45) Date of Patent: Apr. 14, 2026

(54) SALTED BLOOM FILTERS FOR PEER-TO-PEER DATA DISSEMINATION

(71) Applicant: Ava Labs, Inc., New York, NY (US)

(72) Inventor: Stephen John Buttolph, Brooklyn, NY (US)

(73) Assignee: Ava Labs, Inc., New York, NY (US)

( * ) Notice: Subject to any disclaimer, the term of this patent is extended or adjusted under 35 U.S.C. 154(b) by 0 days.

(21) Appl. No.: 19/301,013

(22) Filed: Aug. 15, 2025

(65) Prior Publication Data

US 2026/0067078 A1 Mar. 5, 2026

Related U.S. Application Data

(60) Provisional application No. 63/690,945, filed on Sep. 5, 2024.

(51) Int. Cl.
*H04L 9/08* (2006.01)
*H04L 9/00* (2022.01)
*H04L 9/32* (2006.01)
(52) U.S. Cl.
CPC .......... *H04L 9/0869* (2013.01); *H04L 9/3236* (2013.01); *H04L 9/50* (2022.05)
(58) Field of Classification Search
CPC ........ H04L 9/0869; H04L 9/50; H04L 9/3236
USPC .......................................................... 713/168
See application file for complete search history.

(56) References Cited

U.S. PATENT DOCUMENTS

| | | | | |
|---|---|---|---|---|
| 7,702,640 | B1* | 4/2010 | Vermeulen | G06F 16/2246 |
| | | | | 707/999.1 |
| 2014/0211659 | A1* | 7/2014 | Abraham | H04W 8/005 |
| | | | | 370/254 |
| 2018/0357434 | A1 | 12/2018 | Roy | |
| 2021/0117578 | A1* | 4/2021 | Cheruvu | G06F 21/85 |
| 2021/0319127 | A1* | 10/2021 | Lin | G06F 21/44 |
| 2022/0138118 | A1* | 5/2022 | Willoughby | G06F 3/067 |
| | | | | 710/118 |
| 2023/0108083 | A1 | 4/2023 | Ramabaja | |

(Continued)

OTHER PUBLICATIONS

"Add gossip package to p2p SDK", comment thread #1958, Sep. 2023, accessed at https://github.com/ava-labs/avalanchego/pull/1958 on Sep. 12, 2025, 6 pages.

(Continued)

*Primary Examiner* — Michael S McNally
(74) *Attorney, Agent, or Firm* — Barnes & Thornburg LLP

(57) ABSTRACT

Disclosed herein are systems, methods, and technology for secure data dissemination in a network that reduces false positives. A method can include: initializing a bloom filter, generating a cryptographic seed value, generating salted data based on combinations of the cryptographic seed value and each data value in a set of local data values, injecting the salted data into the bloom filter to generate a salted bloom filter, selecting a random peer node in a network, transmitting the salted bloom filter and the cryptographic seed value to the selected random peer node, receiving, from the selected random peer node, at least one other data value that was identified by the selected random peer node as not being included in the salted bloom filter, and adding the at least one other data value to the set of local data values.

29 Claims, 7 Drawing Sheets

(56)                     References Cited

U.S. PATENT DOCUMENTS

2024/0129108  A1 *   4/2024  Liu ....................... H04L 9/0618
2024/0311821  A1 *   9/2024  Davies ..................... H04L 9/50

OTHER PUBLICATIONS

"Optimize bloom filter", comment thread #2588, Sep. 2023, accessed at https://github.com/ava-labs/avalanchego/pull/2588 on Sep. 12, 2025, pages.
Collins, "What is a Blockchain Mempool and How Does it Work?", Cyfrin, Apr. 19, 2024, accessed at https://www.cyfrin.io/blog/what-is-a-blockchain-mempool-and-how-does-it-work on Sep. 10, 2025, 13 pages.
Izekor, "Exploring Merkle Roots and Bloom Filters in Bitcoin", Feb. 28, 2024, accessed at https://medium.com/@benarivo66/exploring-merkle-roots-and-bloom-filters-in-bitcoin-2818dfd52d04 on Sep. 10, 2025, 8 pages.
Ramani, "Exploring the methods of looking into Ethereum's transaction pool (mempool)", Oct. 26, 2022, accessed at https://medium.com/@benarivo66/exploring-merkle-roots-and-bloom-filters-in-bitcoin-2818dfd52d04 pm Sep. 10, 2025, 17 pages.
Breidenbach et al., "Privacy-enhanced robust image hashing with bloom filters", Proceedings of the 15th International Conference on Availability, Reliability and Security, New York, New York, Aug. 25, 2020, pp. 1-10.
International Search Report and Written Opinion in PCT/US2025/042171 dated Dec. 8, 2025, 11 pages.

* cited by examiner

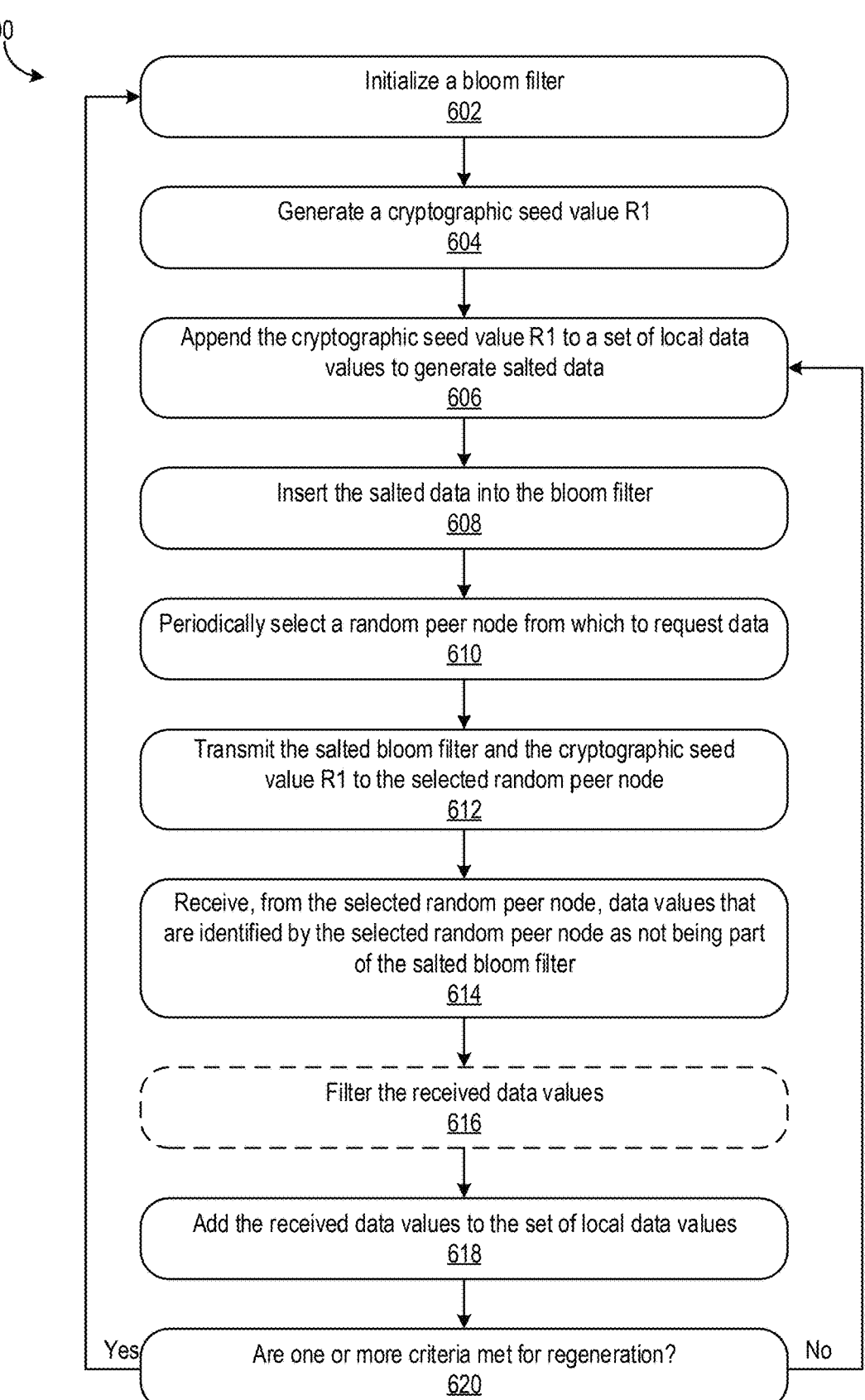

600

Initialize a bloom filter
602

Generate a cryptographic seed value R1
604

Append the cryptographic seed value R1 to a set of local data values to generate salted data
606

Insert the salted data into the bloom filter
608

Periodically select a random peer node from which to request data
610

Transmit the salted bloom filter and the cryptographic seed value R1 to the selected random peer node
612

Receive, from the selected random peer node, data values that are identified by the selected random peer node as not being part of the salted bloom filter
614

Filter the received data values
616

Add the received data values to the set of local data values
618

Yes    Are one or more criteria met for regeneration?    No
620

FIG. 6

SALTED BLOOM FILTERS FOR PEER-TO-PEER DATA DISSEMINATION

CROSS-REFERENCE TO RELATED APPLICATIONS

This application claims the benefit of priority of U.S. Provisional Patent Application No. 63/690,945, filed Sep. 5, 2024, the entirety of which is incorporated herein by reference.

TECHNICAL FIELD

This disclosure generally describes devices, systems, and methods related to cryptographically-salted bloom filters to prevent malicious nodes from generating a disproportionate number of false positives in a peer-to-peer (P2P) network.

BACKGROUND

A bloom filter is a probabilistic data structure that can enable inclusion tests. Bloom filters can be described by a few parameters. A size of the bloom filter is a number of bits that can be set (m) along with a number (and definition) of hash functions (k). Each hash function maps an input to one of the bits. Accordingly, the output range of the hash function can be [0, m). The difficulty of finding a hash collision can be based on the size of the output range of the hash function. This can cause a design tradeoff. Increasing m provides additional collision resistance, but decreases usefulness of the bloom filter. In a cooperative environment, this tradeoff can be made fairly easily. However, in an environment where malicious parties may attempt to intentionally generate hash collisions, this tradeoff cannot be made as easily.

In some technologies, such as blockchain technologies, transaction hashes are sent to all peers. If a transaction hash is seen for a transaction that is not known locally, the transaction can be requested from the peer. While this prevents seeing redundant transactions, this can result in redundantly seeing the same transaction hash from many different nodes. In other technologies, bloom filters may be used to listen to specific types of transactions by including the traits of the transactions in the bloom filter. However, this usage does not improve distribution efficiency or fault tolerance of transaction dissemination for block producers. This usage therefore doesn't result in concerns around hash collisions impacting dissemination.

SUMMARY

The disclosure generally describes technology for cryptographically-salted bloom filters to ensure secure data dissemination between nodes in a network and reduce false positives in the presence of malicious nodes. A concern with using bloom filters, such as for IP gossip, is that a malicious node may grind to find an IP that collides with another node's IP. If this were to happen, the network may fail to disseminate information about the virtuous node's IP. To address this issue, the disclosed technology provides an additional component to a bloom filter, which can act similarly to a salt for storing password hashes. When creating a bloom filter using the disclosed technology, in addition to parameters for size of the bloom filter as a number of bits that can be set (m) and a number (and definition) of hash functions (k), a node can generate a cryptographically strong random string, or a SALT. Rather than inserting the data directly into the bloom filter, data can be inserted into the bloom filter along with the SALT. In order for a malicious node to attempt to generate collisions within the bloom filter, both the conflicting IP and the SALT must be known to the malicious peer. As a result, this prevents network-wide bloom filter collisions. Additional modifications can also be made to thwart attacks against any specific node in the network. For example, nodes can periodically regenerate their bloom filters and corresponding SALTs. Importantly, such regeneration may not cause additional costs to the nodes because they already periodically regenerate bloom filters to support deletion of old data.

Typical bloom filters can be used to determine whether some data appears within a dataset. A bloom filter can be most effective if false positives can be avoided (e.g., in hashing, multiple data can be hashed to the same value). It can also be desirable if the bloom filter is small and compact. Accordingly, the disclosed technology provides for reducing or otherwise avoiding false positives by cryptographically salting the bloom filter, assuming the presence of a malicious node in the network, and preventing global collisions. A random seeded value (e.g., SALT) can be appended to or combined with a data value that is then hashed over and inserted into a bloom filter. The salted bloom filter, along with the cryptographic random seeded value, can be shared with another node. The other node can append its local data with the cryptographic random seeded value and then compare its local data to the salted bloom filter to determine whether one or more data is missing from the salted bloom filter. The missing data can be flagged. The flagged data may also be transmitted to the node that generated the salted bloom filter. Use of the cryptographic random seeded value also can allow for frequent regeneration of the bloom filter to further ensure secure and optimized data dissemination and reduction or overall avoidance of false positives from potentially malicious nodes in the network.

One or more embodiments described herein can include a method for secure data dissemination in a network that reduces false positives, the method including: initializing a bloom filter, generating a cryptographic seed value, generating salted data based on combinations of the cryptographic seed value and each data value in a set of local data values, injecting the salted data into the bloom filter to generate a salted bloom filter, selecting a random peer node in a network, transmitting the salted bloom filter and the cryptographic seed value to the selected random peer node, receiving, from the selected random peer node, at least one other data value that was identified by the selected random peer node as not being included in the salted bloom filter, and adding the at least one other data value to the set of local data values.

In some implementations, the embodiments described herein can optionally include one or more of the following features. For example, generating the salted data can include appending the cryptographic seed value to each data value in the set of local data values. The method can also include appending the cryptographic seed value to the at least one other data value and iteratively performing the injecting, the periodically selecting, the transmitting, the receiving, and the adding.

The method may also include: determining whether one or more criteria are met for regeneration, based on a determination that the one or more criteria are met for regeneration, initializing a second bloom filter, generating a second cryptographic seed value, generating second salted data based on combinations of the second cryptographic seed value and each data value in the set of local data values that includes the at least one other data value, and inserting the second salted data into the second bloom filter. The method may also include iteratively performing the periodically selecting, the transmitting, the receiving, and the adding. The one or more criteria for regeneration can include a predetermined period of time. The one or more criteria for regeneration can include generation of a new query or a new transaction in the network.

In some implementations, injecting the salted data into the bloom filter can include injecting the salted data into a hash array of the bloom filter, where each data of the salted data can be associated with a different index in the hash array. Generating the salted data can include padding each data value in the set of local data values with the cryptographic seed value. The padding can include adding the crypto-graphic seed value to a beginning of the data value. The padding can include adding the cryptographic seed value to an end of the data value. The set of local data values can include IP addresses. The set of local data values can include IP address and transaction validators. The network can include a blockchain. The transmitting can include trans-mitting, to the selected random peer node, the salted bloom filter and the cryptographic seed value without the set of local data values.

One or more embodiments described herein can include a method for generating a salted bloom filter at a node in a network, the method including: initializing a bloom filter, generating a cryptographic seed value, generating salted data based on combinations of the cryptographic seed value with each data value in a set of local data value, injecting the salted data into the bloom filter to generate a salted bloom filter, the salted bloom filter including a hash array, where each data of the salted data can be associated with a different index in the hash array, and returning the salted bloom filter.

In some implementations, the method can optionally include one or more of the above features and/or one or more of the following features. For example, the method can also include determining whether one or more criteria are met for regeneration and based on a determination that the one or more criteria are met for regeneration, initializing a second bloom filter. Based on a determination that the one or more criteria are met for regeneration, the method further can include: generating a second cryptographic seed value. Gen-erating the salted data can include: appending the second cryptographic seed value to each data value in the set of local data values to generate second salted data and inserting the second salted data into the second bloom filter. The second bloom filter can include a second hash array, where each data of the second salted data can be associated with a different index in the second hash array. The one or more criteria for regeneration can include a predetermined period of time.

Sometimes, returning the salted bloom filter can include: transmitting the salted bloom filter and the cryptographic seed value to a random peer node in a network and receiving, from the random peer node, at least one other data value that was identified by the random peer node as not being included in the salted bloom filter. The method further may include adding the at least one other data value to the set of local data values. The method can also include appending the cryptographic seed value to the at least one other data value that was added to the set of local data values.

One or more embodiments described herein can include a system for secure data dissemination in a network that reduces false positives, the system including: a first node, a second node in network communication with the first node in a network, the first node being configured to perform operations that can include: generating a cryptographic seed value, generating salted data for the first node based on combinations of the cryptographic seed value with each data value in a set of local data values for the first node, injecting the salted data for the first node into a bloom filter to generate a salted bloom filter, selecting the second node in the network, and transmitting the salted bloom filter and the cryptographic seed value to the second node. The second node can be configured to perform operations that can include: receiving the salted bloom filter and the crypto-graphic seed value from the first node, combining each data value in a set of local data values for the second node with the cryptographic seed value from the first node to generate salted data for the second node, comparing the salted data for the second node to the salted data for the first node in the salted bloom filter, and returning, based on the comparing, comparison results.

The system can optionally include one or more of the abovementioned features and/or one or more of the follow-ing features. For example, the second node can be config-ured to perform operations further including: flagging at least one data value of the salted data for the second node that, based on the comparing, may not be included amongst the salted data for the first node in the salted bloom filter. The comparison results can include the flagged at least one data value of the salted data for the second node. Returning, based on the comparing, the comparison results can include transmitting the flagged at least one data value of the salted data for the second node to the first node. The first node can be configured to perform operations further including: receiving, from the second node, the flagged at least one data value, and adding the at least one data value to the set of local data values for the first node. The second node can be configured to perform operations further including: gener-ating a second cryptographic seed value that can be different than the cryptographic seed value that was generated by the first node, generating salted data for the second node based on combinations of the second cryptographic seed value with each data value in the set of local data values for the second node, and injecting the salted data for the second node into a second bloom filter to generate a salted bloom filter for the second node, the second bloom filter being different than the bloom filter of the first node. The second node can be configured to perform operations that may also include: selecting the first node in the network, and trans-mitting the salted bloom filter for the second node and the second cryptographic seed value to the first node. The second node can be further configured to perform operations that may include: randomly selecting a peer node in the network, and transmitting the salted bloom filter for the second node and the second cryptographic seed value to the randomly selected peer node.

The devices, system, and techniques described herein may provide one or more of the following advantages. For example, adding a node specific, cryptographically strong SALT to a node's bloom filter can prevent malicious nodes from generating a disproportionate number of false posi-tives. With this new primitive, bloom filters can be used to optimize data dissemination between virtuous nodes in a potentially malicious P2P network.

Moreover, cryptographically salting bloom filters can introduce additional security layers to improve censorship resistance, improve security in multi-tenant environments, defend against hash collisions, improve resilience against specific attacks, and customize hash functions. Salting a bloom filter can make it more difficult for malicious nodes to use precomputed tables or other information to identify collisions or manipulate the bloom filter. Salting can help mitigate the risk of hash collisions by adding an additional layer of randomness, which can be particularly useful in scenarios where hash functions might be vulnerable to different types of attacks. Salting may also allow for the customization of hash functions, which can be tuned to better fit specific use cases and/or improve performance characteristics.

As another example, using bloom filters reduces the required bandwidth to synchronize a (potentially volatile) set of data across a distributed network. Using bloom filters also provides a mechanism to perform pull-based gossip. Pull gossip can be useful to reduce tail latency of data dissemination. Using traditional (non-salted) bloom filters in such a situation would be vulnerable to denial of service/ censorship attacks. Thus, salting the bloom filters prevents these attacks, which allows for using bloom filters in this context. This use can also reduce bandwidth usage and reduces p99 latency of information dissemination.

The details of one or more implementations are set forth in the accompanying drawings and the description below. Other features and advantages will be apparent from the description and drawings, and from the claims.

BRIEF DESCRIPTION OF THE DRAWINGS

FIG. 6 is a flowchart of a process for salting data values for inclusion in a bloom filter and using the salted bloom filter for data dissemination between nodes of a network.

In the present disclosure, like-numbered components of various embodiments generally have similar features when those components are of a similar nature and/or serve a similar purpose, unless otherwise noted or otherwise understood by a person skilled in the art.

DETAILED DESCRIPTION OF ILLUSTRATIVE EMBODIMENTS

This disclosure generally relates to techniques for cryptographically salting bloom filters to optimize data dissemination between nodes in a P2P network and reduce or otherwise avoid false positives. A bloom filter can be used to create a compressed representation of a set of data that allows for efficient inclusion checks. For example, the size of a set of IP addresses of transaction validators in a network, such as a P2P network. With this compressed set of data, the bloom filter can be used to check whether a specific IP address is possibly in the set. These lookups may include false positives (e.g., IPs being in the set when they aren't). The disclosed technology provides for cryptographically salting the bloom filter to prevent malicious nodes from generating a disproportionate number of false positives.

The disclosed techniques can be performed using one or more different types of bloom filters. This disclosure is not intended to be construed as limited to a particular type of bloom filter described herein. Different variants of bloom filters can support various properties, such as increasing locality within the filter (which can be useful for bloom filters that are stored on a disk or high performance inclusion checks), supporting efficient deletion (without re-computing the entire bloom filter), and/or reducing a serialized size of the bloom filter (which can be used to further decrease bandwidth usage). Examples of different types of filters that can be used with the disclosed techniques include, but are not limited to, counting bloom filters, quotient filters, cuckoo filters, and/or xor filters.

Figure 1:
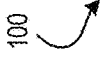
FIG. 1 is a conceptual diagram of a system for salting data values for inclusion a bloom filter.

Referring to the figures, FIG. 1 is a conceptual diagram of a system 100 for salting data values 106A-N for inclusion in a bloom filter 110 (e.g., the salted bloom filter 110). A bloom filter engine 102 can be configured to initialize a bloom filter 110. The engine 102 can also salt data values 106A-N with a cryptographic seed value 112 (e.g., SALT). The engine 102 can also populate a hash array 108 of the bloom filter 110 with the salted data values 106A-N. In other words, the engine 102 can generate the hash array 108 with the salted data values 106A-N.

The engine 102 can be part of a node in a network, as described further herein. The engine 102 can generate a random string value as the cryptographic seed value 112. In some implementations, the cryptographic seed value 112 can be generated by other components of the node or other systems in the network.

The data values 106A-N can be locally stored at the node in the network. In some illustrative examples, the data values 106A-N can include IP addresses and transactions. Other data values 106A-N may include but are not limited to blocks, files, or any type of data that can be stored in a distributed hash table (DHT). The data values 106A-N can include other types of data that may be dynamically changing. For example, the data values 106A-N may be associated with new transactions that are submitted to a pool of transactions on a blockchain. If a new validator joins the network, the validator needs their IP address to be gossiped, thus the set of IP addresses has been updated. P2P networks, such as blockchains, may perform gossip mechanisms to disseminated information through the networks. Conventional systems may send data associated with the new transactions in multiple hashes to all connected nodes, which may exhaust available bandwidth. The disclosed techniques, on the other hand, provide a more technologically advantageous solution for data dissemination in a P2P network, as described herein.

The engine 102 can append, pad, add, insert, or otherwise combine the cryptographic seed value 112 to each of the data values 106A-N to generate salted data values. The hash array 108 of the bloom filter 110 can then be injected with the salted data values to generate the salted bloom filter 110. In other words, the salted data values (which is a combination of each of the data values 106A-N and the cryptographic seed value 112) can be hashed in the hash array 108. As shown in FIG. 1, indexes $H_0$, $H_3$, and $H_n$ (shaded darker in the hash array 108 in comparison to indexes $H_1$, $H_2$, and $H_4$) have been hashed with the data values 106A-N.

Figure 2:
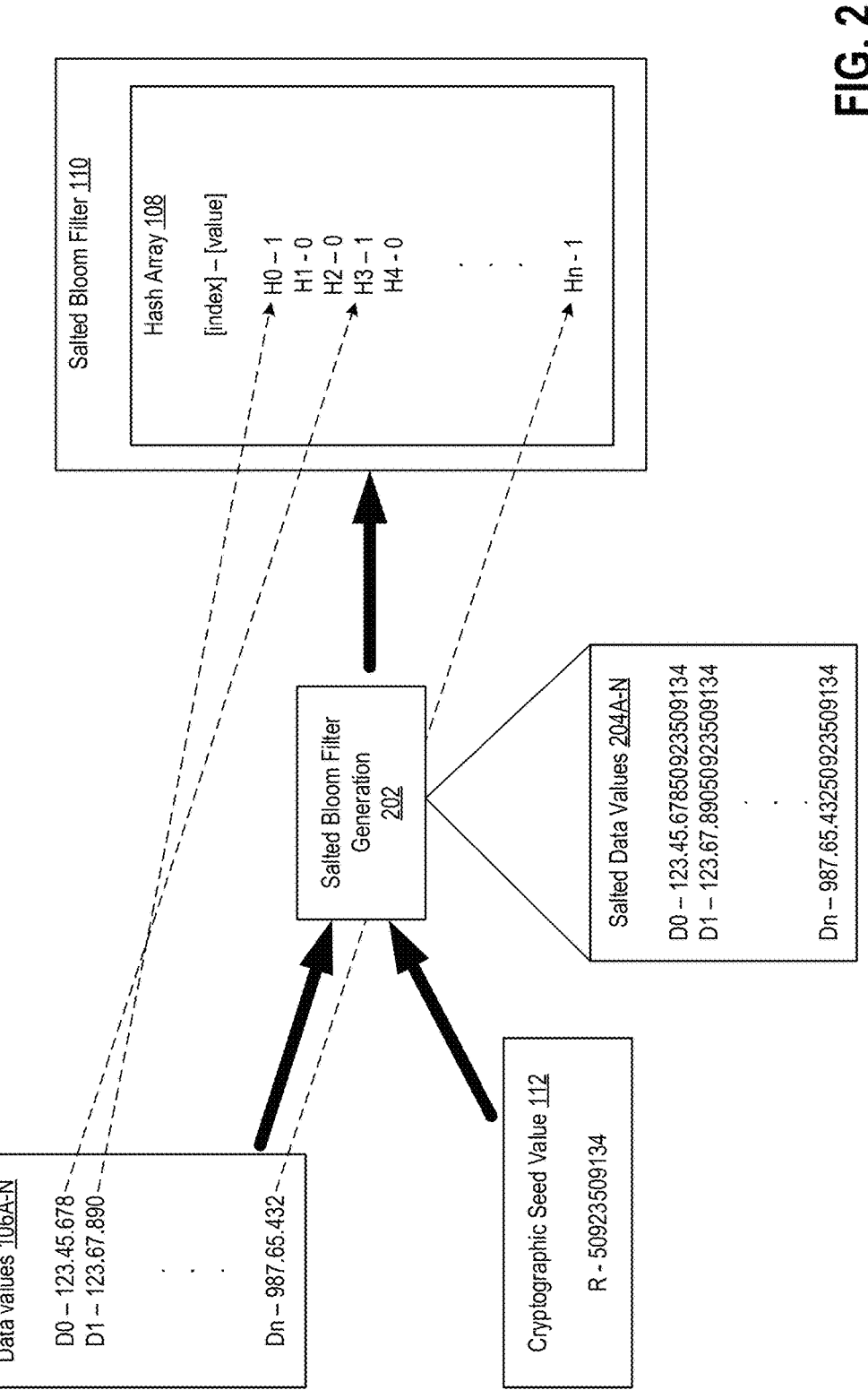
FIG. 2 is another conceptual diagram of a system for salting data values for inclusion in a bloom filter.

FIG. 2 is another conceptual diagram of the system 100 of FIG. 1 for salting the data values 106A-N for inclusion in the salted bloom filter 110. As described in reference to FIG. 1, salted bloom filter generation techniques 202 can be performed (e.g., by the engine 102) by combining the data values 106A-N and the cryptographic seed value 112 to generate salted data values 204A-N. In the illustrative example of FIG. 2, the data values 106A-N can include values $D_0$-$D_n$. In the illustrative example of FIG. 2, the cryptographic seed value 112 can be a randomly generated string R.

As part of the generation techniques 202, the node (e.g., the engine 102 of the node) can append the cryptographic seed value 112 to each of the data values 106A-N to generate the salted data values 204A-N. In some implementations, appending the cryptographic seed value 112 to the data values 106A-N can include adding or appending the value 112 to a front of each of the data values 106A-N, adding or appending the value 112 to an end of each of the data values 106A-N, or otherwise combining or inserting the value 112 into each of the data values 106A-N. In some implementations, rules can be established and used so that the nodes append the cryptographic seed value 112 in a predetermined and/or uniform way. The nodes, for example, may agree on how to create a randomized fingerprint (e.g., the salted data values 204A-N) from the actual data values 106A-N along with the cryptographic seed value 112. In some implementations, the agreed-upon strategy can include cryptographically hashing the concatenation of the non-randomized fingerprint (e.g., the data values 106A-N) with the cryptographic seed value 112. The randomized fingerprint (e.g., the salted data values 204A-N) can then be used as normal in the salted bloom filter 110.

As part of the generation techniques 202, the node can then inject the salted data values 204A-N into the salted bloom filter 110 by hashing the salted data values 204A-N in the hash array 108. The hash array 108 may include indexes and corresponding values (e.g., Boolean values indicating whether the index corresponds to a data value). According to the illustrative hash array 108 of FIG. 2, the data value $D_0$ can be hashed to index $H_3$ in the hash array 108, the data value $D_1$ can be hashed to index $H_0$ in the hash array 108, and the data value $D_n$ can be hashed to index $H_n$ in the hash array 108. As a result of using the hash array 108, the salted data values 204A-N can be transmitted from the node to another peer node without identifying the actual data values 106A-N. This the data value corresponding to each index in the hash array 108 can indicate whether the index is associated with any one or more of the actual data values 106A-N. As an illustrative example, a Boolean value of 1 can indicate that the index corresponds to a data value of the actual data values 106A-N while a Boolean value of 0 can indicate that the index does not correspond to a data value of the actual data values 106A-N. Other values can be used instead of Boolean values, including but not limited to string values, integers, and/or numeric values.

Figure 3:
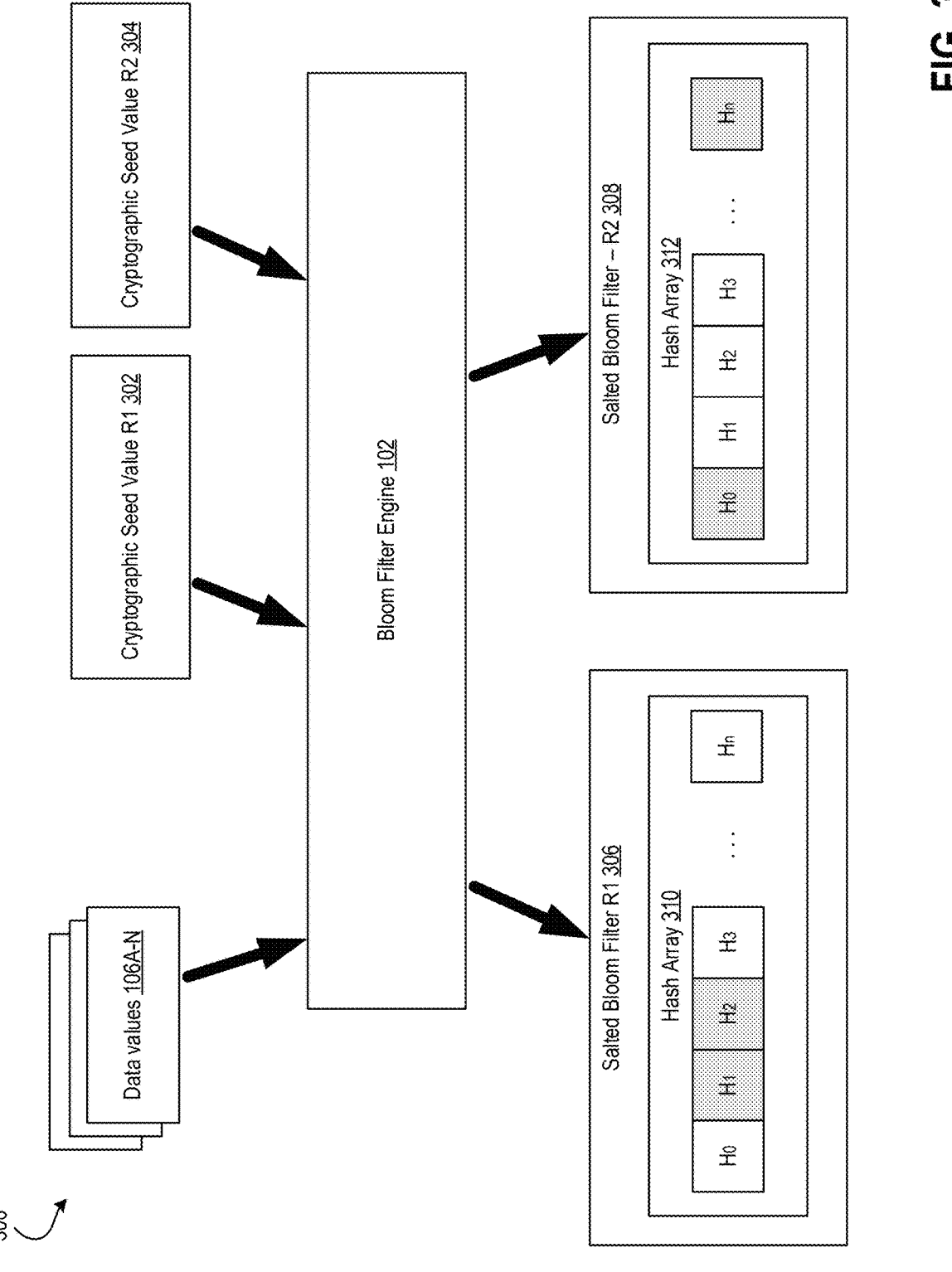
FIG. 3 is a conceptual diagram of a system for regenerating salted bloom filters using regenerated cryptographic seed values (e.g., SALT).

FIG. 3 is a conceptual diagram of a system 300 for regenerating salted bloom filters R1 (306) and R2 (308) using regenerated cryptographic seed values R1 (302) and R2 (304) (e.g., SALT). As described herein, periodically, the bloom filter engine 102 of the system 300 can regenerate the salted bloom filters R1 (306) and R2 (308) as well as the cryptographic seed values R1 (302) and R2 (304) in order to enhance security and prevent malicious nodes or other users from generating hash collisions. Regeneration can occur frequently and/or periodically to keep false positive rates down. As a result of regeneration, potentially malicious nodes would not know local data values at respective nodes unless those local data values are given to the malicious nodes. Therefore, as salted bloom filters and cryptographic seed values become more public/transmitted between nodes in a network, such filters and values can be reset (e.g., regenerated) so that the potentially malicious nodes do not get a hold of those filters and values. Sometimes, a malicious node learning about a cryptographic seed value may not be critical since generating a new cryptographic seed value can be fairly inexpensive, requiring little compute resources, and done frequently. In some implementations, regeneration can occur per every new query in the system 300.

Sets of data used with the disclosed techniques can be volatile or otherwise constantly changing. Queries can therefore be performed based on time. An example query can include selecting a node in the network to query every second, every 3 seconds, every 5 seconds, etc. Another illustrative query can include a first node (i) providing a salted bloom filter with the cryptographic seed value of all validator IPs that the first node is currently aware of and (ii) asking a second node whether they know any validator IPs that the first node does not know about. As another example, a query can include the first node (i) providing the salted bloom filter with the cryptographic seed value of transactions that the first node is aware of and (ii) asking the second node whether they know any transactions that the first node does not know about. Sometimes, the bloom filter can be regenerated after a query is performed. In some implementations, the bloom filter can be regenerated if a false positive probability increases past a predetermined threshold value (e.g., 1% of validator IPs, 5% for transactions). As another example, the bloom filter can be regenerated at predetermined times, such as every 1 minute, every 3 minutes, every 5 minutes, etc. The predetermined times for regeneration can vary based on whether the query relates to validator IPs, transactions, or other factors described herein.

Regeneration can include removing previously generated and used salted bloom filters and/or cryptographic seed values from storage in the system 300. According to the disclosed techniques, the same data values 106A-N can be provided as input to the bloom filter engine 102 and appended with different cryptographic seed values at different times to cause different indexing in a hash array of salted bloom filters.

For example, the cryptographic seed value R1 (302) can be generated by the system 300 at a first time and appended with the data values 106A-N by the bloom filter engine 102 to generate the salted bloom filter R1 (306). As shown, the salted bloom filter R1 (306) can include a hash array 310, in which indexes $H_1$ and $H_2$ have been associated with the data values 106A-N appended with the cryptographic seed value R1 (302).

At a second time, which can be a predetermined amount of time after the first time or any amount of time after the first time, the system 300 can generate the cryptographic seed value R2 (304). The cryptographic seed value R2 (304) can be different than the cryptographic seed value R1 (302). Sometimes, the cryptographic seed value R2 (304) can be a regeneration of the cryptographic seed value R1 (302). At the second time, the system 300 can remove or otherwise delete the cryptographic seed value R1 (302) so that it cannot be recovered or otherwise used. Also during the second time, the system 300 can append the same data values 106A-N from the first time with the cryptographic seed value R2 (304) to generate the salted bloom filter R2 (308). The salted bloom filter R2 (308) can include a hash array 312, in which indexes $H_0$ and $H_n$ have been associated with the data values 106A-N appended with the cryptographic seed value R2 (304).

Figure 4:
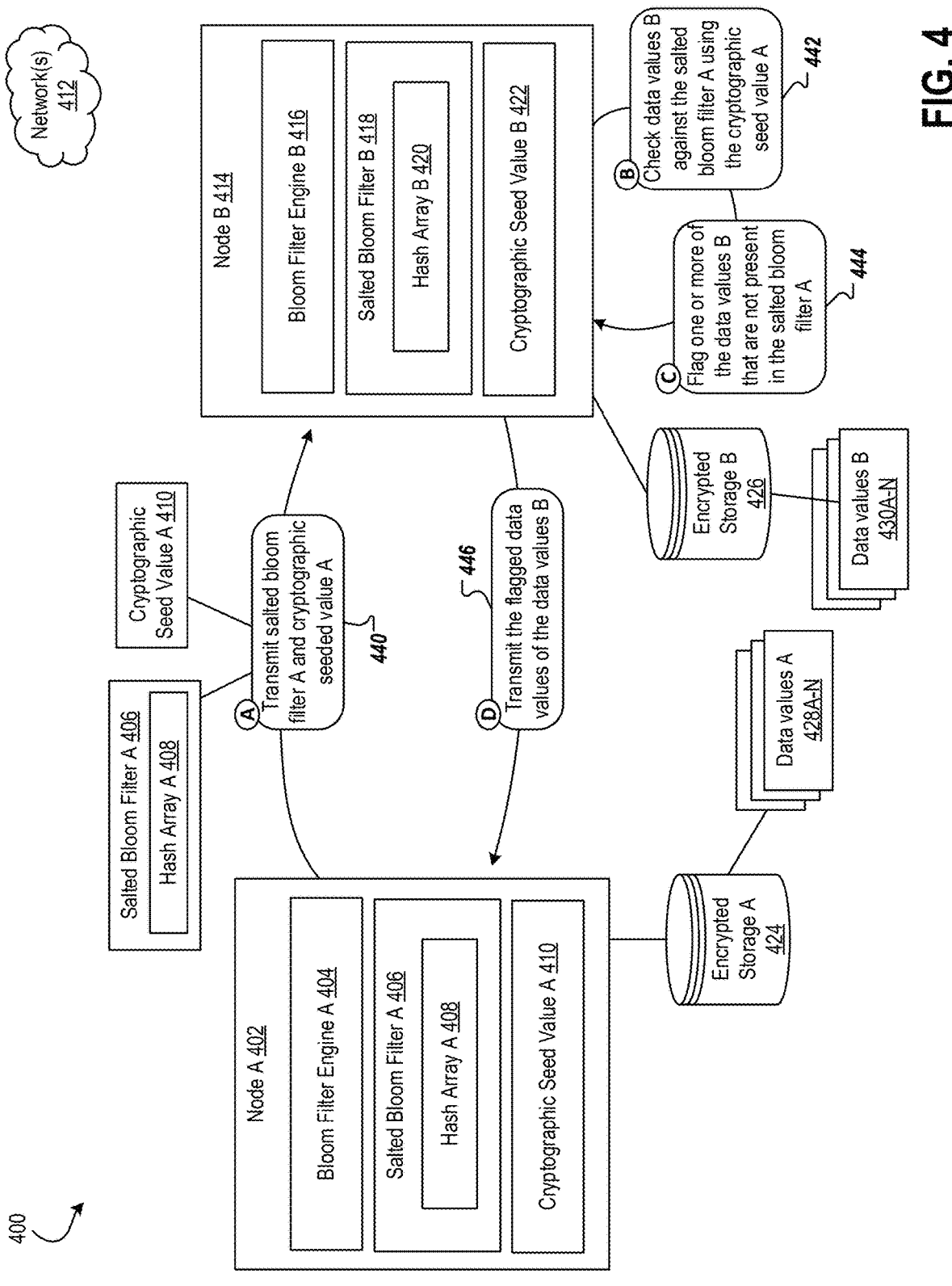
FIG. 4 is a conceptual diagram of a system in which two virtuous nodes communicate with each other using the disclosed techniques.

FIG. 4 is a conceptual diagram of a system 400 in which two virtuous nodes A (402) and B (414) communicate with each other using the disclosed techniques. The nodes A (402) and B (414) can communicate via network(s) 412. In some implementations, the nodes A (402) and B (414) can communicate using blockchain technology. The nodes A (402) and B (414) can communicate with each other to perform data dissemination techniques, such as one node sharing data with the other node based upon a determination that the other node does not already have that data.

The node A (402) can have encrypted storage A (424), which can be configured to store data values A (428A-N). The node B (414) can have respective encrypted storage B (426), which can be configured to store data values B (430A-N). The encrypted storage A (424) and B (426) can be any type of data storage system, including but not limited to local memory, local storage, databases, data stores, and/or cloud-based storage. The data values A (428A-N) and B (430A-N) can include data such as IP addresses and transaction validators. Other types of data may also be locally stored that can be used for transactions and gossip mechanisms across the network(s) 412. As described herein, sometimes, the data values A (428A-N) and B (430A-N) may be the same. Sometimes, the data values A (428A-N) may include some but not all of the data values B (430A-N) or vice versa. The disclosed techniques can therefore be used to identify when the data values A (428A-N) and B (430A-N) are not the same and provide missing data to one or both of the nodes A (402) and B (414).

The node A (402) can include a bloom filter engine A (404), a salted bloom filter A (406) having a hash array A (408), and a cryptographic seed value A (410). Similarly, the node B (414) can include a bloom filter engine B (416), a salted bloom filter B (418) having a hash array B (420), and a cryptographic seed value B (422). The bloom filter engines A (404) and B (416) are similar to the engine 102 described herein. Refer to at least FIGS. 1, 2, and 3 for further discussion about the bloom filter engines A (404) and B (416). Each of the nodes A (402) and B (414) have their own salted bloom filters A (406) and B (418), respectively. The salted bloom filters A (406) and B (418) can each be generated and populated locally at the respective node A (402) and node B (414) using the disclosed techniques. Similarly, each of the nodes A (402) and B (414) can have their own cryptographic seed values A (410) and B (422), respectively. The cryptographic seed values A (410) and B (422) can be uniquely generated and used by the respective bloom filter engines A (404) and B (416) to salt the respective local data values A (428A-N) and B (430A-N) and then inject into the respective hash arrays A (408) and B (420) of the respective salted bloom filters A (406) and B (418). As described in reference to at least FIG. 3, the cryptographic seed values A (410) and B (422) can be regenerated at the respective nodes A (402) and B (414) periodically and/or at different times. Accordingly, the salted bloom filters A (406) and B (418) can also be regenerated periodically and/or at different times.

Still referring to the system 400 in FIG. 4, the node A (402) can transmit the salted bloom filter A (406) having the hash array A (408) and the cryptographic seed value A (410) to the node B (414) (block A, 440).

The node B (414) can check the data values B (430A-N) from the encrypted storage B (426) against the salted values indexed in the hash array A (408) of the salted bloom filter A (406) using the cryptographic seed value A (410) (block B, 442). For example, the bloom filter engine B (416) of the node B (414) can salt the local data values B (430A-N) with the received cryptographic seed value A (410) and compare those salted values to the hash array A (408) of the salted bloom filter A (406) to see whether those salted values match or otherwise appear to be indexed in the hash array A (408).

The bloom filter engine B (416) can append the cryptographic seed value A (410) to the local data values B (430A-N) in a predictable way to determine whether these salted values match the data values A (428A-N) associated with the salted bloom filter A (406). As described herein, all nodes in the network can agree on a mechanism for appending cryptographic seed values to local data values in a predictable way.

Accordingly, the node B (414) can flag one or more of the local data values B (430A-N) that are not present in the salted bloom filter A (406) in block C (444). The node B (414) can check the salted bloom filter A (406) for inclusion of the local data values B (430A-N) of the node B (414). If the local data values B (430A-N), appended with the cryptographic seed value A (410), are present in the hash array A (408) of the salted bloom filter A (406), then the node B (414) may not do anything (since this means that the node A (402) is not missing the local data values B (430A-N)) or otherwise may move to checking next data values amongst the local data values B (430A-N).

The node B (414) can then transmit the flagged data values of the local data values B (430A-N) to the node A (402) in block D (446). In other words, the node B (414) transmits only the data values that are not present in the salted bloom filter A (406) of the node A (402) so that the node A (402) can update its local data values A (428A-N) to include the transmitted data values.

Although the system 400 is described from the perspective of the node A (402) checking its local data values A (428A-N) against the local data values B (430A-N) of the node B (414) using the salted bloom filter A (406) and the cryptographic seed value A (410), blocks A (440), B (442), C (444), and D (446) can also be performed such that the node B (414) can check its local data values B (430A-N) against the local data values A (428A-N) of the node A (402) using the salted bloom filter B (418) and the cryptographic seed value B (422). In other words, block A (440) can also be performed by the node B (414) and blocks B (442), C (444), and D (446) can be performed by the node A (402). Accordingly, the disclosed techniques can be performed by both the nodes A (402) and B (414) at same or different times so that each of the nodes A (402) and B (414) can swap/share their data values A (428A-N) and B (430A-N) in a secure and reliable way to check and/or update their own data values.

Figure 5:
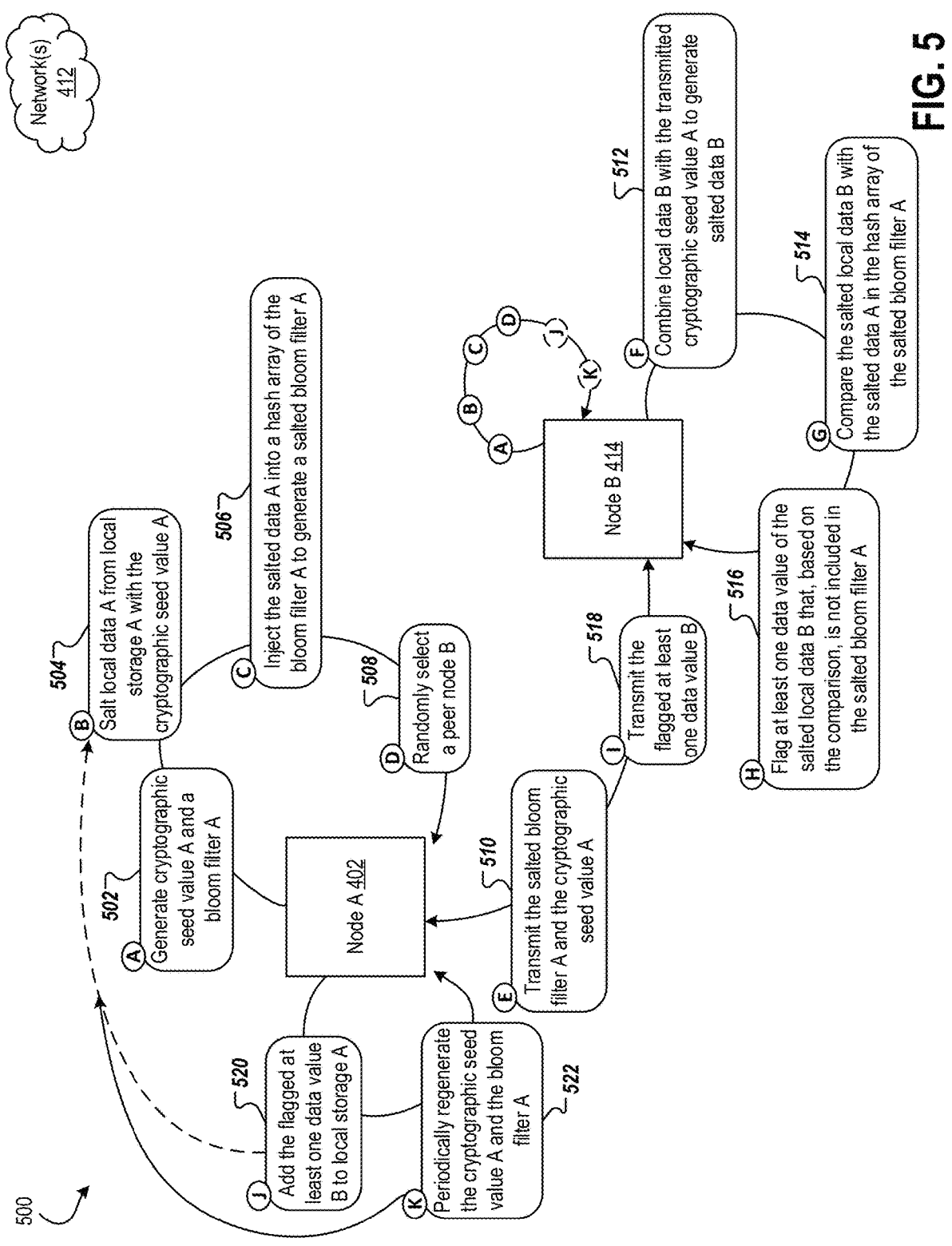
FIG. 5 is another conceptual diagram of a system for transmitting data between nodes using the disclosed techniques.

FIG. 5 is another conceptual diagram of a system 500 for transmitting data between the nodes A (402) and B (414) using the disclosed techniques. As described in reference to the system 400 of FIG. 4, the nodes A (402) and B (414) can communicate with each other via the network(s) 412.

The node A (402) can generate a cryptographic seed value A and a bloom filter A in block A (502). As described herein, each node in the system 500 can generate its own cryptographic seed value, which can provide a greater degree of trust between and amongst nodes in the system 500.

In block B (504), the node A (402) can salt local data A from local storage A with the cryptographic seed value A. The local data A can include transaction data, transaction hashes, IP addresses, transaction validators, or any combination thereof. The local data A can be globally-agreed upon values across the network(s). The node A (402) can pad the local data A with the cryptographic seed value A. The cryptographic seed value A can act as a shuffling mechanism for the bloom filter A to protect the local data A from being exposed to potentially malicious nodes in the network(s) 412.

The node A (402) can inject the salted data A into a hash array of the bloom filter A to generate a salted bloom filter A (block C, 506). The node A (402) can determine entry of each of the salted data A into the hash array of the bloom filter A based on padding the data A with the cryptographic seed value A.

The node A (402) can randomly select a peer node, such as the node B (414) in block D (508). Although not depicted, the node A (402) can select any other nodes that may be connected to the network(s) 412. In some implementations, queries can be sent uniformly and randomly to validators in the network(s) 412, the validators including peer nodes. Sometimes, the peer node can be selected by sampling the validators (nodes in the network) based on their stake weight. As another example, the peer node can be selected by sampling all peers in the network, not just validators, based on how much useful data the peers have sent per second (or per other predetermined period of time). If a node, for example, frequently provides the node A (402) updated validator IPs, the node A (402) can then sample that node more frequently than other nodes or peers that have not been providing updated validator IPs or have been providing the updated validator IPs less frequently.

Once selected, the node A (402) can transmit the salted bloom filter A and the cryptographic seed value A to the node B (414) in block E (510).

The node B (414) can combine local data B with the transmitted cryptographic seed value A to generate salted data B at the node B (414) (block F, 512).

The node B (414) can then compare the salted local data B with the salted data A in the hash array of the salted bloom filter A (block G, 514). The node B (414) can compare the data in order to identify overlap of data values. Overlapping data values indicate that the node A (402) has the globally-agreed upon data values across the network(s) 412. If there are non-overlapping data values (e.g., one or more of the node B's data values do not appear in the salted bloom filter A of the node A), then the node A (402) is likely missing data values that the node B already has. Sometimes, the comparison can yield information such as an indication that the node A (402) may already have the data. The comparison can yield information such as an indication that the node A (402) does not have the data already. In the illustrative example here, when the node A (402) requested values from the node B (414), the comparison in block G (514) yields an indication that the node A (402) definitely does not have the data, which ensures that duplicate data is not sent from the node B (414) to the node A (402).

Moreover, if a malicious node has injected malicious data into the salted bloom filter A, the malicious data may not conflict with the local data B that the node B (414) uses for its check, thereby ensuring both security and trust across the network(s) 412. In an illustrative example, a data set can have a value Data0. A large number of virtuous nodes can be connected in the network. If a malicious node were to attempt to find a collision for Data0, the malicious node would have to find Data1 such that it can generate a collision Data0 not just for a single cryptographic seed value, but for every virtuous nodes' cryptographic seed value(s). If the malicious node does not know the cryptographic seed values of all the nodes, then any cryptographic seed value it does not know would correspond to bloom filters with the same false positive probability of a normal bloom filter (without a malicious node). Additionally, because nodes are rotating their cryptographic seed values, it is probabilistically improbable for the malicious node to sustain a DoS or censorship attack against this synchronization.

Based on the comparison, the node B (414) can flag at least one data value of the salted local data B that is not included in the salted bloom filter A (block H, 516). Sometimes, the node B (414) may find that all the salted local data B appears indexed in the hash array of the salted bloom filter A, so none of the data may be flagged. As a result, sometimes, the techniques may stop and/or the node B (414) can transmit a notification to the node A (402) indicating that the values in the salted bloom filter A are up-to-date or otherwise accurate (they do not need to be updated).

In block I (518), the node B (414) can transmit the flagged at least one data value of the local data values B to the node A (402).

The node A (402) can add the flagged at least one data value of the local data values B of the node B (414) to the local storage A (block J, 520).

The node A (402) can optionally return to block B (504) and salt the local data A, which now includes the flagged at least one data value, with the cryptographic seed value A.

In some implementations, the node A (402) can, instead of returning to block B (504), periodically regenerate the cryptographic seed value A and the bloom filter A in block K (522). In response to regenerating the cryptographic seed value A and the bloom filter A, the node A (402) can then proceed to block B (504) and salt the local data A, which includes the flagged at least one data value, with the regenerated cryptographic seed value A.

As described in reference to the system 400 of FIG. 4, the node B (414) can also perform similar operations as the node A (402) in order to check the local data B of the node B (414) against the local data values A of the node A (402). The node B (414) can, for example, perform one or more of the blocks A (502), B (504), C (506), D (508), E (510), J (520), and/or K (522). The node A (402) can, for example, perform one or more of the blocks F (512), G (514), H (516), and/or I (518). The nodes A (402) and B (414) can perform the disclosed techniques at the same time. The nodes A (402) and B (414) can additionally or alternatively perform the disclosed techniques at different times.

FIG. 6 is a flowchart of a process 600 for salting data values in a bloom filter and using the salted bloom filter for data dissemination between nodes of a network. The process 600 can be performed by any nodes in a network, such as virtuous nodes in the network (e.g., blockchain). For example, the process 600 can be performed by node A (402) and/or node B (414) described in reference to FIGS. 4 and 5. For illustrative purposes, the process 600 is described from the perspective of a node.

Referring to the process 600 in FIG. 6, the node can initialize a bloom filter in block 602. The bloom filter can be initialized as empty and ready to be used to perform network gossip and other similar techniques described herein. When initializing the bloom filter, an optimal bloom filter can be generated based on expected size of the data to synchronize and the desired false positive probability at that size. The node can iterate over the local dataset and insert all the values currently held into the bloom filter.

In block 604, the node can generate a cryptographic seed value R1. The cryptographic seed value R1 can be a random string value.

The node can append the cryptographic seed value R1 to a set of local data values to generate salted data (block 606). For example, the node can salt the local data values with the cryptographic seed value R1. Salting the local data values can include combining the cryptographic seed value R1 with each of the local data values. The cryptographic seed value R1 can be attached to or otherwise appended or inserted at a front of each of the local data values. The cryptographic seed value R1 can be attached to or otherwise appended or inserted at an end of each of the local data values. Various other appending techniques can be performed to combine the local data values with the cryptographic seed value.

The node can also insert the salted data into the bloom filter in block 608. This can ensure that checking inclusion of any of the salted data values inserted into the bloom filter will show as a potentially already known value. As described herein, inserting the salted data into the bloom filter can include adding each of the salted data values into a secure hashed array in the bloom filter.

In block 610, the node may periodically select a random peer node from which to request data. In some implementations, the node can perform a query for validator IPs immediately upon connecting to a new peer. Sometimes, the node can uniformly randomly sample from a connected validator set at predetermined times (e.g., every 1 second, every 2 seconds, every 3 seconds, every 5 seconds, every 10 seconds, every 15 seconds). As another example, nodes can perform a query for transactions (e.g., for each chain that they are running) and uniformly and randomly sample from the connected validator set at predetermined times (e.g., every 1 second, every 1.5 seconds, every 2 seconds, every 2.5 seconds, every 5 seconds, every 5.5 seconds).

The node can also transmit the salted bloom filter and the cryptographic seed value R1 to the selected random peer node (bloke 612).

Referring to both blocks 610 and 612, periodically selecting the random peer node and transmitting the filter and the cryptographic seed value R1 notifies the selected random peer node that another node may want to learn information from the selected random peer node. Blocks 610 and 612 provides the nodes with the ability to efficiently filter redundant data. For example, and as described in reference to FIGS. 4 and 5, filtering can be done by iterating over local data values at the selected random peer node and checking, using the cryptographic seed value R1, whether they are also contained in the salted bloom filter from the other node. Importantly, the cryptographic seed value R1 may only be notified to the random peer node that was selected. If the selected random peer node is virtuous, for example, then revealing the cryptographic seed value R1 to that node may not enable a malicious peer to attempt to generate collisions.

The node can receive, from the selected random peer node, data values that are identified by the selected random peer node as not being part of the salted bloom filter in block 614. In other words, the selected random peer node can respond with the data values that it identifies as not currently known by the requesting node. Block 614 allows for the selected random peer node to provide the identified data values to the requesting node without including redundant information, since the bloom filters do not have false negatives.

Optionally, the node may filter the received data values (block 616). Filtering the data may be performed in the event that the selected random peer node was malicious. For example, if the set of local data values at the requesting node (e.g., the node) is intended to contain IP addresses of transaction validators, but the returned IP address was not tied to a validator, the node can flag the returned IP address so that it is not added to the set of local data values at the node. One or more different rules and/or criteria can be generated and used to filter the received data values and determine which of those received data values should be added to the set of local data values at the node.

The node can add the received data values to the set of local data values in block 618.

In block 620, the node can determine whether one or more criteria are met for regeneration. The one or more criteria for regeneration can include time. For example, if a predetermined amount of time has passed since the node initialized the bloom filter in block 602 and/or generated the cryptographic seed value R1, then the node can proceed to block 602, otherwise the node can proceed to block 606. One or more other criteria can be used, such as time and/or false positive probability (assuming virtuous entries) into the bloom filter. The one or more criteria can additionally or alternatively include a number of nodes to which the node has revealed the cryptographic seed value R1. Sometimes, the number of nodes factor can be included in the time factor, since the cryptographic seed value R1 can be revealed during queries and the queries can be generally performed at a steady rate or predetermined timeframe.

If the one or more criteria are met (e.g., a predetermined amount of time has passed since last the node performed block 602 and/or block 604), then the node can return to block 602, initialize a new bloom filter, or otherwise regenerate the bloom filter, and repeat the process 600. The node can also regenerate the cryptographic seed value R1, and thus create a new cryptographic seed value R2. When the node regenerates the bloom filter and the cryptographic seed value R2, the node can remove from storage the previous bloom filter and the previous cryptographic seed value R1 that was used in the process 600. As a result, such techniques can ensure that the cryptographic seed value R1 does not become public so that malicious peers may target the node, or other nodes communicating with the node in a network.

If the one or more criteria are not met for regeneration in block 620, then the node can return to block 606 and append the cryptographic seed value R1 to the set of local data that includes the data values that were added to the set in block 618. The node can then continue through the process 600.

Figure 7:
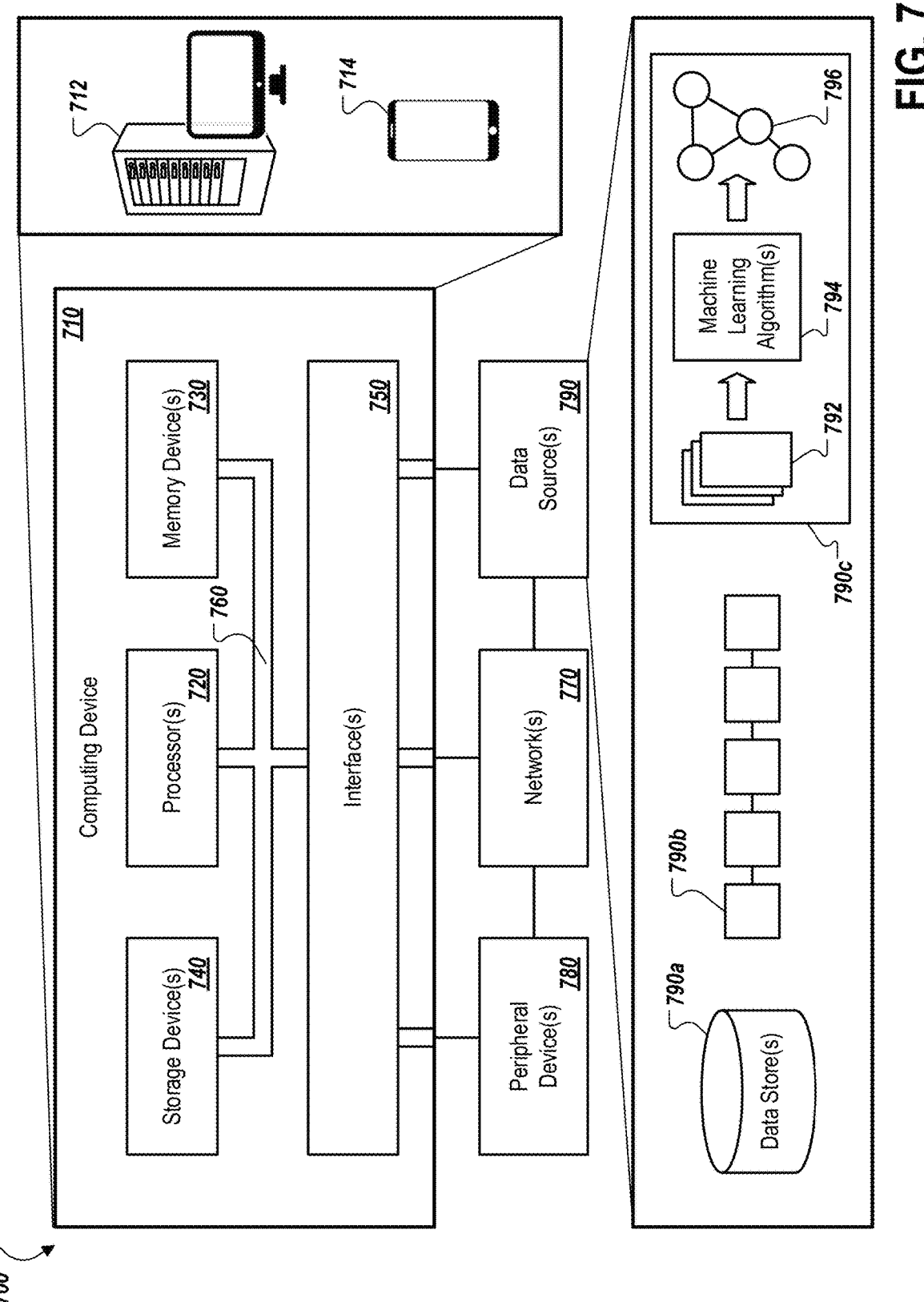
FIG. 7 is a schematic diagram that shows an example of a computing device and a mobile computing device.

FIG. 7 is a schematic diagram that shows an example of a computing system 700 that can be used to implement the techniques described herein. The computing system 700 includes one or more computing devices (e.g., computing device 710), which can be in wired and/or wireless communication with various peripheral device(s) 780, data source(s) 790, and/or other computing devices (e.g., over network(s) 770). The computing device 710 can represent various forms of stationary computers 712 (e.g., workstations, kiosks, servers, mainframes, edge computing devices, quantum computers, etc.) and mobile computers 714 (e.g., laptops, tablets, mobile phones, personal digital assistants, wearable devices, etc.). In some implementations, the computing device 710 can be included in (and/or in communication with) various other sorts of devices, such as data collection devices (e.g., devices that are configured to collect data from a physical environment, such as microphones, cameras, scanners, sensors, etc.), robotic devices (e.g., devices that are configured to physically interact with objects in a physical environment, such as manufacturing devices, maintenance devices, object handling devices, etc.), vehicles (e.g., devices that are configured to move throughout a physical environment, such as automated guided vehicles, manually operated vehicles, etc.), or other such devices. Each of the devices (e.g., stationary computers, mobile computers, and/or other devices) can include components of the computing device 710, and an entire system can be made up of multiple devices communicating with each other. For example, the computing device 710 can be part of a computing system that includes a network of computing devices, such as a cloud-based computing system, a computing system in an internal network, or a computing system in another sort of shared network. Processors of the computing device (710) and other computing devices of a computing system can be optimized for different types of operations, secure computing tasks, etc. The components shown herein, and their functions, are meant to be examples, and are not meant to limit implementations of the technology described and/or claimed in this document.

The computing device 710 includes processor(s) 720, memory device(s) 730, storage device(s) 740, and interface (s) 750. Each of the processor(s) 720, the memory device(s) 730, the storage device(s) 740, and the interface(s) 750 are interconnected using a system bus 760. The processor(s) 720 are capable of processing instructions for execution within the computing device 710, and can include one or more single-threaded and/or multi-threaded processors. The processor(s) 720 are capable of processing instructions stored in the memory device(s) 730 and/or on the storage device(s) 740. The memory device(s) 730 can store data within the computing device 710, and can include one or more computer-readable media, volatile memory units, and/or non-volatile memory units. The storage device(s) 740 can provide mass storage for the computing device 710, and can include various computer-readable media (e.g., a floppy disk device, a hard disk device, a tape device, an optical disk device, a flash memory or other similar solid state memory device, or an array of devices, including devices in a storage area network or other configurations), and can provide date security/encryption capabilities.

The interface(s) 750 can include various communications interfaces (e.g., USB, Near-Field Communication (NFC), Bluetooth, WiFi, Ethernet, wireless Ethernet, etc.) that can be coupled to the network(s) 770, peripheral device(s) 780, and/or data source(s) 790 (e.g., through a communications port, a network adapter, etc.). Communication can be provided under various modes or protocols for wired and/or wireless communication. Such communication can occur, for example, through a transceiver using a radio-frequency. As another example, communication can occur using light (e.g., laser, infrared, etc.) to transmit data. As another example, short-range communication can occur, such as using Bluetooth, WiFi, or other such transceiver. In addition, a GPS (Global Positioning System) receiver module can provide location-related wireless data, which can be used as appropriate by device applications. The interface(s) 750 can include a control interface that receives commands from an input device (e.g., operated by a user) and converts the commands for submission to the processors 720. The interface(s) 750 can include a display interface that includes circuitry for driving a display to present visual information to a user. The interface(s) 750 can include an audio codec which can receive sound signals (e.g., spoken information from a user) and convert it to usable digital data. The audio codec can likewise generate audible sound, such as through an audio speaker. Such sound can include real-time voice communications, recorded sound (e.g., voice messages, music files, etc.), and/or sound generated by device applications.

The network(s) 770 can include one or more wired and/or wireless communications networks, including various public and/or private networks. Examples of communication networks include a LAN (local area network), a WAN (wide area network), and/or the Internet. The communication networks can include a group of nodes (e.g., computing devices) that are configured to exchange data (e.g., analog messages, digital messages, etc.), through telecommunications links. The telecommunications links can use various techniques (e.g., circuit switching, message switching, packet switching, etc.) to send the data and other signals from an originating node to a destination node. In some implementations, the computing device 710 can communicate with the peripheral device(s) 780, the data source(s) 790, and/or other computing devices over the network(s) 770. In some implementations, the computing device 710 can directly communicate with the peripheral device(s) 780, the data source(s), and/or other computing devices.

The peripheral device(s) 780 can provide input/output operations for the computing device 710. Input devices (e.g., keyboards, pointing devices, touchscreens, microphones, cameras, scanners, sensors, etc.) can provide input to the computing device 710 (e.g., user input and/or other input from a physical environment). Output devices (e.g., display units such as display screens or projection devices for displaying graphical user interfaces (GUIs)), audio speakers for generating sound, tactile feedback devices, printers, motors, hardware control devices, etc.) can provide output from the computing device 710 (e.g., user-directed output and/or other output that results in actions being performed in a physical environment). Other kinds of devices can be used to provide for interactions between users and devices. For example, input from a user can be received in any form, including visual, auditory, or tactile input, and feedback provided to the user can be any form of sensory feedback (e.g., visual feedback, auditory feedback, or tactile feedback).

The data source(s) 790 can provide data for use by the computing device 710, and/or can maintain data that has been generated by the computing device 710 and/or other devices (e.g., data collected from sensor devices, data aggregated from various different data repositories, etc.). In some implementations, one or more data sources can be hosted by the computing device 710 (e.g., using the storage device(s) 740). In some implementations, one or more data sources can be hosted by a different computing device. Data can be provided by the data source(s) 790 in response to a request for data from the computing device 710 and/or can be provided without such a request. For example, a pull technology can be used in which the provision of data is driven by device requests, and/or a push technology can be used in which the provision of data occurs as the data becomes available (e.g., real-time data streaming and/or notifications) . Various sorts of data sources can be used to implement the techniques described herein, alone or in combination.

In some implementations, a data source can include one or more data store(s) 790a. The database(s) can be provided by a single computing device or network (e.g., on a file system of a server device) or provided by multiple distributed computing devices or networks (e.g., hosted by a computer cluster, hosted in cloud storage, etc.). In some implementations, a database management system (DBMS) can be included to provide access to data contained in the database(s) (e.g., through the use of a query language and/or application programming interfaces (APIs)). The database (s), for example, can include relational databases, object databases, structured document databases, unstructured document databases, graph databases, and other appropriate types of databases.

In some implementations, a data source can include one or more blockchains 790b. A blockchain can be a distributed ledger that includes blocks of records that are securely linked by cryptographic hashes. Each block of records includes a cryptographic hash of the previous block, and transaction data for transactions that occurred during a time period. The blockchain can be hosted by a peer-to-peer computer network that includes a group of nodes (e.g., computing devices) that collectively implement a consensus algorithm protocol to validate new transaction blocks and to add the validated transaction blocks to the blockchain. By storing data across the peer-to-peer computer network, for example, the blockchain can maintain data quality (e.g., through data replication) and can improve data trust (e.g., by reducing or eliminating central data control).

In some implementations, a data source can include one or more machine learning systems 790c. The machine learning system(s) 790c, for example, can be used to analyze data from various sources (e.g., data provided by the computing device 710, data from the data store(s) 790a, data from the blockchain(s) 790b, and/or data from other data sources), to identify patterns in the data, and to draw inferences from the data patterns. In general, training data 792 can be provided to one or more machine learning algorithms 794, and the machine learning algorithm(s) can generate a machine learning model 796. Execution of the machine learning algorithm(s) can be performed by the computing device 710, or another appropriate device. Various machine learning approaches can be used to generate machine learning models, such as supervised learning (e.g., in which a model is generated from training data that includes both the inputs and the desired outputs), unsupervised learning (e.g., in which a model is generated from training data that includes only the inputs), reinforcement learning (e.g., in which the machine learning algorithm(s) interact with a dynamic environment and are provided with feedback during a training process), or another appropriate approach. A variety of different types of machine learning techniques can be employed, including but not limited to convolutional neural networks (CNNs), deep neural networks (DNNs), recurrent neural networks (RNNs), and other types of multi-layer neural networks.

Various implementations of the systems and techniques described herein can be realized in digital electronic circuitry, integrated circuitry, specially designed ASICs (application specific integrated circuits), computer hardware, firmware, software, and/or combinations thereof. A computer program product can be tangibly embodied in an information carrier (e.g., in a machine-readable storage device), for execution by a programmable processor. Various computer operations (e.g., methods described in this document) can be performed by a programmable processor executing a program of instructions to perform functions of the described implementations by operating on input data and generating output. The described features can be implemented in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, by a computer to perform a certain activity or bring about a certain result. A computer program can be written in any form of programming language, including compiled or interpreted languages, and can be deployed in any form, including as a stand-alone program or as a module, component, subroutine, or other unit suitable for use in a computing environment. A computer program product can be a computer- or machine-readable medium, such as a storage device or memory device. As used herein, the terms machine-readable medium and computer-readable medium refer to any computer program product, apparatus and/or device (e.g., magnetic discs, optical disks, memory, etc.) used to provide machine instructions and/or data to a programmable processor, including a machine-readable medium that receives machine instructions as a machine-readable signal. The term machine-readable signal refers to any signal used to provide machine instructions and/or data to a programmable processor.

Suitable processors for the execution of a program of instructions include, by way of example, both general and special purpose microprocessors, and can be a single processor or one of multiple processors of any kind of computer. Generally, a processor will receive instructions and data from a read-only memory or a random access memory or both. The elements of a computer are a processor for executing instructions and one or more memory devices for storing instructions and data. Generally, a computer can also include, or can be operatively coupled to communicate with, one or more mass storage devices for storing data files. Such devices can include magnetic disks (e.g., internal hard disks and/or removable disks), magneto-optical disks, and optical disks. Storage devices suitable for tangibly embodying computer program instructions and data can include all forms of non-volatile memory, including by way of example semiconductor memory devices, flash memory devices, magnetic disks (e.g., internal hard disks and removable disks), magneto-optical disks, and optical disks. The processor and the memory can be supplemented by, or incorporated in, ASICs (application-specific integrated circuits).

The systems and techniques described herein can be implemented in a computing system that includes a back end component (e.g., a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). The computer system can include clients and servers, which can be generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A method for secure data dissemination in a network that reduces false positives, the method comprising:
   initializing a bloom filter;
   generating a cryptographic seed value;
   generating salted data based on combinations of the cryptographic seed value and each data value in a set of local data values, wherein generating the salted data comprises padding each data value in the set of local data values with the cryptographic seed value;
   injecting the salted data into the bloom filter to generate a salted bloom filter;
   selecting a random peer node in a network;
   transmitting the salted bloom filter and the cryptographic seed value to the selected random peer node;
   receiving, from the selected random peer node, at least one other data value that was identified by the selected random peer node as not being included in the salted bloom filter; and
   adding the at least one other data value to the set of local data values.

2. The method of claim 1, wherein the method further comprises:
   padding the at least one other data value with the cryptographic seed value; and
   iteratively performing the injecting, the periodically selecting, the transmitting, the receiving, and the adding.

3. The method of claim 1, wherein injecting the salted data into the bloom filter comprises injecting the salted data into a hash array of the bloom filter, wherein each data of the salted data is associated with a different index in the hash array.

4. The method of claim 1, wherein the padding comprises adding the cryptographic seed value to a beginning of the data value.

5. The method of claim 1, wherein the padding comprises adding the cryptographic seed value to an end of the data value.

6. The method of claim 1, wherein the set of local data values comprises IP addresses.

7. The method of claim 1, wherein the set of local data values comprises IP address and transaction validators.

8. The method of claim 1, wherein the network comprises a blockchain.

9. The method of claim 1, wherein the transmitting comprises transmitting, to the selected random peer node, the salted bloom filter and the cryptographic seed value without the set of local data values.

10. A method for secure data dissemination in a network that reduces false positives, the method comprising:
   initializing a bloom filter;
   generating a cryptographic seed value;
   generating salted data based on combinations of the cryptographic seed value and each data value in a set of local data values;
   injecting the salted data into the bloom filter to generate a salted bloom filter;
   selecting a random peer node in a network;
   transmitting the salted bloom filter and the cryptographic seed value to the selected random peer node;
   receiving, from the selected random peer node, at least one other data value that was identified by the selected random peer node as not being included in the salted bloom filter;

adding the at least one other data value to the set of local data values;
   determining whether one or more criteria are met for regeneration;
   based on a determination that the one or more criteria are met for regeneration, initializing a second bloom filter;
   generating a second cryptographic seed value;
   generating second salted data based on combinations of the second cryptographic seed value and each data value in the set of local data values that includes the at least one other data value; and
   inserting the second salted data into the second bloom filter.

11. The method of claim 10, wherein the method further comprises iteratively performing the periodically selecting, the transmitting, the receiving, and the adding.

12. The method of claim 10, wherein the one or more criteria for regeneration comprises a predetermined period of time.

13. The method of claim 10, wherein the one or more criteria for regeneration comprises generation of a new query or a new transaction in the network.

14. A method for generating a salted bloom filter at a node in a network, the method comprising:
   initializing a bloom filter;
   generating a cryptographic seed value;
   generating salted data based on combinations of the cryptographic seed value with each data value in a set of local data values;
   injecting the salted data into the bloom filter to generate a salted bloom filter, wherein the salted bloom filter comprises a hash array, wherein each data of the salted data is associated with a different index in the hash array;
   returning the salted bloom filter;
   determining whether one or more criteria are met for regeneration; and
   based on a determination that the one or more criteria are met for regeneration, initializing a second bloom filter.

15. The method of claim 14, wherein, based on a determination that the one or more criteria are met for regeneration, the method further comprises: generating a second cryptographic seed value.

16. The method of claim 15, wherein generating the salted data comprises:
   padding each data value in the set of local data values with the second cryptographic seed value to generate second salted data; and
   inserting the second salted data into the second bloom filter.

17. The method of claim 16, wherein the second bloom filter comprises a second hash array, wherein each data of the second salted data is associated with a different index in the second hash array.

18. The method of claim 15, wherein the one or more criteria for regeneration comprises a predetermined period of time.

19. The method of claim 14, wherein returning the salted bloom filter comprises:
   transmitting the salted bloom filter and the cryptographic seed value to a random peer node in a network; and
   receiving, from the random peer node, at least one other data value that was identified by the random peer node as not being included in the salted bloom filter.

20. The method of claim 19, wherein the method further comprises: adding the at least one other data value to the set of local data values.

21. The method of claim 20, wherein the method further comprises:

appending the cryptographic seed value to the at least one other data value that was added to the set of local data values.

22. A system for secure data dissemination in a network that reduces false positives, the system comprising:

a first node;

a second node in network communication with the first node in a network, wherein the first node is configured to perform operations comprising:

generating a cryptographic seed value;

generating salted data for the first node based on combinations of the cryptographic seed value with each data value in a set of local data values for the first node, wherein generating the salted data for the first node comprises padding each data value in the set of local data values for the first node with the cryptographic seed value;

injecting the salted data for the first node into a bloom filter to generate a salted bloom filter;

selecting the second node in the network; and transmitting the salted bloom filter and the cryptographic seed value to the second node;

wherein the second node is configured to perform operations comprising:

receiving the salted bloom filter and the cryptographic seed value from the first node;

combining each data value in a set of local data values for the second node with the cryptographic seed value from the first node to generate salted data for the second node by padding each data value in the set of local data values for the second node with the cryptographic seed value;

comparing the salted data for the second node to the salted data for the first node in the salted bloom filter; and returning, based on the comparing, comparison results.

23. The system of claim 22, wherein the second node is configured to perform operations further comprising: flagging at least one data value of the salted data for the second node that, based on the comparing, is not included amongst the salted data for the first node in the salted bloom filter.

24. The system of claim 23, wherein the comparison results comprise the flagged at least one data value of the salted data for the second node.

25. The system of claim 23, wherein returning, based on the comparing, the comparison results comprises transmitting the flagged at least one data value of the salted data for the second node to the first node.

26. The system of claim 25, wherein the first node is configured to perform operations further comprising:

receiving, from the second node, the flagged at least one data value; and adding the at least one data value to the set of local data values for the first node.

27. The system of claim 22, wherein the second node is configured to perform operations further comprising:

generating a second cryptographic seed value that is different than the cryptographic seed value that was generated by the first node;

generating salted data for the second node based on combinations of the second cryptographic seed value with each data value in the set of local data values for the second node; and injecting the salted data for the second node into a second bloom filter to generate a salted bloom filter for the second node, wherein the second bloom filter is different than the bloom filter of the first node.

28. The system of claim 27, wherein the second node is configured to perform operations further comprising:

selecting the first node in the network; and transmitting the salted bloom filter for the second node and the second cryptographic seed value to the first node.

29. The system of claim 27, wherein the second node is configured to perform operations further comprising:

randomly selecting a peer node in the network; and transmitting the salted bloom filter for the second node and the second cryptographic seed value to the randomly selected peer node.

* * * * *